April 12, 1960 J. KRIEGER 2,932,478
ADJUSTABLE CAMERA DOLLY
Filed June 26, 1958
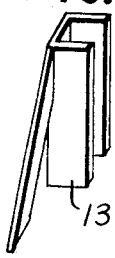
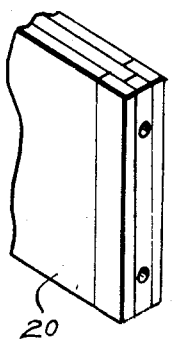
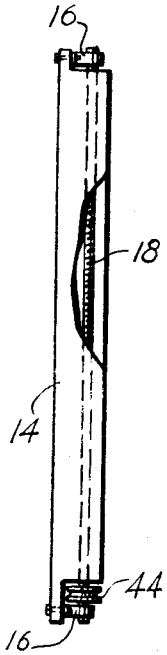
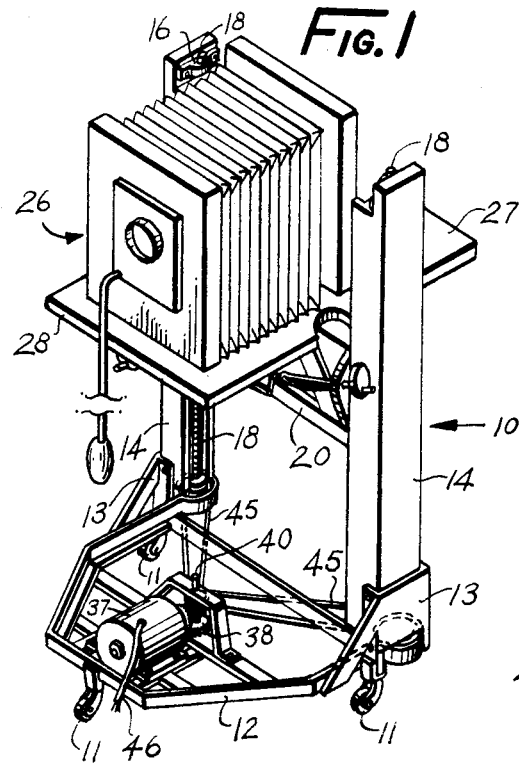
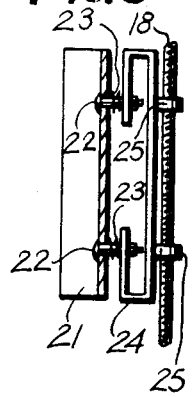
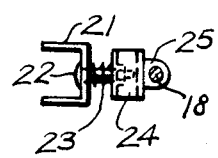
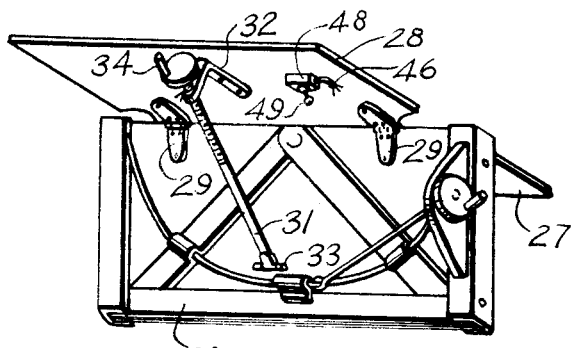
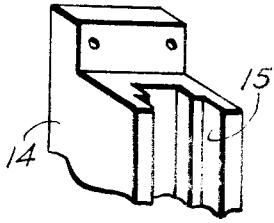
INVENTOR.
JACK KRIEGER United States Patent Office 2,932,478
Patented Apr. 12, 1960

2,932,478

ADJUSTABLE CAMERA DOLLY

Jack Krieger, Jewell, Kans.

Application June 26, 1958, Serial No. 744,737

2 Claims. (Cl. 248—125)

This invention relates to photographic apparatus and more particularly to a dolly for cameras.

It is an object of the present invention to provide a completely adjustable dolly for supporting photographic cameras in a selected position that is extremely simple to manipulate and operate, and which is capable of minute adjustment.

Another object of the present invention is to provide adjustable camera dolly of the above type having motive power means for raising and lowering the camera in a quick and efficient manner without any effort on the part of the operator so as to enable exact photographic positions to be obtained.

Other objects of the invention are to provide an adjustable camera dolly bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a perspective view of an adjustable camera dolly made in accordance with the present invention in operative use;

Figure 2 is an enlarged fragmentary perspective view of certain parts of the apparatus shown in Figure 1;

Figure 3 is a side elevational view, with parts broken away, of a support post forming a part of the present invention;

Figure 4 is an enlarged fragmentary perspective view of certain parts of the support post shown in Figure 3;

Figure 5 is a fragmentary longitudinal cross sectional view of other support elements forming a part of the present invention;

Figure 6 is a top plan view of the parts illustrated in Figure 5;

Figure 7 is a fragmentary perspective view of one end of a bridge forming another part of the present invention; and Figure 8 is a perspective view of a brace forming another part of the present invention.

Referring now more in detail to the drawing, an adjustable camera dolly 10 made in accordance with the present invention is shown to include a base frame 12 that is rollably supported upon a supporting surface upon casters 11. This base frame 12 includes integral and rigid side braces or brackets 13 which receive the lower ends of a pair of spaced apart parallel vertical side posts 14 defining inwardly opening channel ways 15.

Pillow block bearing elements 16 are secured to the opposite vertical extremities of each of the side posts 14 for rotatably supporting individual threaded rods 18 therein. A bridge member 20 having end plates 21 with bolts 22 extending outwardly therefrom are secured to the opposite ends of the bridge 20. These bolts, which are encircled by compression springs 23 are secured to mounting frames 24 which have internally threaded brackets 25 that threadedly receive the threaded rods 18 therethrough. It will thus be recognized that in response to rotation of the threaded rods 18, the bridge 20 may be moved vertically.

A camera 26 of any desired type is supported upon a platform 27 having a forward extension 28 that is pivotally secured to the bridge 20 by means of hinges 29 mounted intermediate the ends of said platform 27, with the rearward extension extending to the rear of said frame 24. A threaded rod 31 rotatably supported at one end within a bearing 33 carried by the bridge 20 is threadedly received at its opposite end within an internally threaded bracket 32 secured to the extension 28. Thus, in response to rotation of an operating handle 34 secured to the outer free end of the shaft 31, threaded engagement between the shaft 31 and the bracket 32 will effect an angular adjustment of the forward extension 28 of the platform 27 to adjust the angle of the camera with respect to a horizontal plane.

Motive power means are provided for selectively raising and lowering the bridge 20 and supported camera 26. A motor 37 secured to the base frame 12 has a drive shaft to which is connected a bevel gear that is in meshing driving engagement with a similar bevel gear 38 secured to a vertical shaft 40 mounted upon the base frame. To this shaft 40, a pair of pulleys 44 are secured which rotate simultaneously. The lower extremity of each threaded rod 18 is also provided with a similar pulley 44 about which a pair of pulley belts 45 are trained into engagement with the pulleys of the vertical shaft 40. Thus, in response to energization of the motor 37, the pulleys drive the belts 45 to rotate the threaded rods 18 and thus raise or lower the platform supporting the camera 26. The supply line 46 of the motor is connected to a switch 48 having an operating lever 49. When the lever 49 is moved forwardly, the motor 37 will elevate the bridge 20 and camera 26, whereas movement of the lever 49 rearwardly will effect a lowering of the camera. It will now be appreciated that a camera dolly has been provided that is completely adjustable for all types of photographic purposes, a minimum amount of effort being necessary to be exerted by the operator in order to obtain an optimum position.

While various changes may be made in the detail construction, it shall be understood that such changes shall be within the spirit and scope of the present invention as defined by the appended claims.

What I claim as new and desire to protect by Letters Patent of the United States is:

1. A dolly for a camera comprising, in combination, a base frame, three caster wheels supporting said base frame so the dolly can be moved from place to place and turned in arcs to aid in focusing a camera thereon, short channel-shaped vertical side braces integrally and rigidly secured to the opposite rear corners of said base frame, a sidepost with an inwardly open channel-way mounted vertically with its lower end within each of said rigid side braces, pillow block bearing elements secured to the opposite vertical extremities of each of said side posts and extending above and below said channel-ways, a rectangular shaped bridge member having vertical end plates, a mounting frame, bolt means securing said bridge member to said mounting frame, a pair of internally threaded brackets horizontally mounted adjacent the opposite ends and upon the rear surface of said mounting frame, a pair of threaded rods, each of said rods extending through a pair of said threaded brackets on the mounting frame and supported within said channel-ways by said pillow block bearing elements, a camera supporting platform pivotally mounted intermediate its ends by hinges secured to said bridge member, manually operable means connected between the forward end of said platform and the base portion of said bridge for tilting the platform to aid in focusing a camera thereon, said manually operable means consisting of a single threaded rod pivotally connected to the base portion of said bridge and threadedly received at its opposite end within an internally threaded bracket secured to the lower surface of the forward extension of said platform and an operating handle secured to the outer free end of said rod whereby turning of said handle effects angular adjustment of said platform, and motor means drivingly connected to the lower ends of said vertical threaded rods within said channel-ways for selectively effecting rotation thereof to adjust the vertical position of said bridge.

2. The combination according to claim 1, wherein said motor means comprises a motor having a drive shaft supported upon said base frame, a pair of pulleys secured to said drive shaft, a pair of pulleys one secured to each of said rods, and a belt drivingly connecting each of said pulleys on said drive shaft to one of said pulleys on each said rod.

References Cited in the file of this patent

UNITED STATES PATENTS

| | | |
|---|---|---|
| 1,032,614 | Lamb | July 16, 1912 |
| 1,915,802 | Roshnell | June 27, 1933 |